(12) United States Patent
Atia et al.

(10) Patent No.: US 6,808,276 B2
(45) Date of Patent: Oct. 26, 2004

(54) SUSPENDED HIGH REFLECTIVITY COATING ON RELEASE STRUCTURE AND FABRICATION PROCESS THEREFOR

(75) Inventors: Walid A. Atia, Lexington, MA (US); Minh Van Le, Methuen, MA (US)

(73) Assignee: Axsun Technologies, Inc., Billerica, MA (US)

( * ) Notice: Subject to any disclaimer, the term of this patent is extended or adjusted under 35 U.S.C. 154(b) by 555 days.

(21) Appl. No.: 09/851,510

(22) Filed: May 8, 2001

(65) Prior Publication Data

US 2002/0168136 A1 Nov. 14, 2002

(51) Int. Cl.[7] .......................... G02B 7/182; B29D 11/00
(52) U.S. Cl. .......................... 359/872; 216/24; 359/224
(58) Field of Search .................. 385/18; 359/872, 359/260, 224; 345/540; 216/24; 372/107

(56) References Cited

U.S. PATENT DOCUMENTS

2002/0080504 A1 * 6/2002 Atia ........................... 359/872
2002/0126726 A1 * 9/2002 Flanders et al. ............ 372/107

* cited by examiner

*Primary Examiner*—Frank G. Font
*Assistant Examiner*—Michael P. Mooney
(74) *Attorney, Agent, or Firm*—J. Grant Houston (57) ABSTRACT

In a MOEMS device and corresponding fabrication process, absorbing material along the optical axis of the device is removed. The result is a suspended optical coating, such as a dielectric thin film mirror stack. Such optical coatings can have very low absorption. Thus, the invention can materially lower the net absorption in the device, and thereby improve performance, by degrading power related dependencies.

25 Claims, 10 Drawing Sheets

SUSPENDED HIGH REFLECTIVITY COATING ON RELEASE STRUCTURE AND FABRICATION PROCESS THEREFOR

BACKGROUND OF THE INVENTION

Examples of micro-optical electromechanical system (MEOMS) release structures include membranes and cantilevered structures. Both of these structures are used in a spectrum of optical applications. For example, they can be coated to be reflective for a spectral band of interest and then paired with another mirror to form a tunable Fabry-Perot (FP) cavity/filter. They can also be used as stand-alone reflective components to define the end of a laser or interferometer cavity, for example.

The structures are typically produced by depositing a device layer over a sacrificial layer, which has been deposited on a support. This sacrificial layer is subsequently etched away or otherwise removed to produce the release structure in a release process. In some examples, the device layer is a silicon compound and the sacrificial layer can be polyimide or oxide, for example.

Typically, release structure deflection is achieved by applying a voltage between the release structure and a fixed electrode on the support structure. Electrostatic attraction moves the structure in the direction of the fixed electrode as a function of the applied voltage. This results in changes in the reflector separation in case of an FP filter, laser, or other optical cavity.

The performance of the MOEMS device typically is affected by the mechanical stability of the release structure and its susceptibility to interference from its immediate environment. It is not uncommon to install the device in a hermetic package with a temperature controller such a thermoelectric cooler. These safeguards help to limit long-term changes due to aging and thermally induced changes in the device.

SUMMARY OF THE INVENTION

Stability, however, can be affected by other factors, such as signal power levels. Semiconductor materials, such as silicon, can absorb light. Even photons with energy below the intrinsic bandgap, such as in the infrared communication wavelengths, can be absorbed through surface states, defects, excess dopants, or two-photon absorption. This absorption can give rise to electron-hole pair generation, which impacts the electric fields surrounding the release structure. This effect can be aggravated by dielectric-based optical coatings because of charge trapping at dielectric interfaces. High powers can also yield temperature gradients.

The effects can be observed in, for example, a tunable Fabry-Perot filter, when tuned to the signal frequency. The filter transforms from essentially reflecting all of the incident light to becoming transparent to it, thereby causing a large change in the surface potential, which moves the optical passband either away from or in the direction of the desired tuning position. The result is a power-dependent passband shape that makes optical parameters, such as the optical signal to noise ration (OSNR), difficult to measure at higher power levels. Another effect of the absorption is heating that gives rise to a power-dependent shift in passband frequency as the filter is thermally expanded by the incident light.

These effects have been observed at mid-power ranges, e.g., −15 dBm to 0 dBm, and high-power, e.g., 0 dBm to 20 dBm, and higher. Such power levels are commonplace with the advent of the erbium-doped fiber amplifier (EDFA) and can be encountered by a receiver filter in a preamplified optical receiver, for example. The result can be the degradation of performance of a tunable MOEMS optical filter.

The present invention is directed to a MOEMS device and corresponding fabrication process in which absorbing material along the optical axis of the device is removed. The result is a suspended optical coating, such as a dielectric thin film mirror stack. Such optical coatings can have very low absorption. Thus, the invention can materially lower the net absorption in the devices, and thereby improves performance by, for example, reducing signal power dependencies.

In general, according to one aspect, the invention features a process for fabricating a micro-optical electromechanical system device. The process comprises depositing an optical coating that is supported by a device layer. A sacrificial layer is removed to form a release structure in the device layer along the optical axis.

Depending on the implementation, the optical coating can be deposited before or after removal of the sacrificial layer to form the release structure.

Finally, a device layer port is formed by removing a portion of the device layer opposite the optical coating in a region around the optical axis. Thus, the optical signal propagating along the optical axis does not have to pass through the material of the device layer or at least less device layer material.

In the described applications, the optical coating is a high reflectivity coating, having greater than 90% power reflectivity to thereby form a mirror structure.

In the preferred embodiment, the optical coating is formed using thin film technology, in which the alternating layers of high and low refractive index materials are deposited on the device layer. The thickness of the layers is related to the wavelength of light that system is intended to handle. Typically, the layers are about one-quarter of a wavelength in thickness, with six or more layers being common for an highly reflecting (HR) coating.

In the typical implementation, the sacrificial layer is removed via an etch process. This sacrificial layer is commonly sandwiched in a region between the device layer and a support. The support can be silicon handle wafer material. In such cases, it is not uncommon to fabricate a support optical port through the wafer material.

According to one implementation, an etch stop layer is first deposited on the device layer, then the optical coating is deposited on the etch stop layer. Then, when the device layer port is formed, an etch is performed through the device layer to the etch stop layer, which can then be later cleared away in another etch process.

In general, according to another aspect, the invention features a MOEMS device. This device comprises at least a first mirror structure and a second mirror structure. These mirror structures define an optical cavity. Further, a support is provided and a deflectable structure on the support that holds the first mirror structure. This deflectable structure is located on an external side of the first mirror relative to the optical cavity. The deflectable structure has an optical port in a region around the optical axis of the optical cavity.

The location of the deflectable membrane structure the outside of the cavity prevents intracavity losses, but renders the device susceptible to instability in operation. The magnitude of light transmitted through the material can change dramatically as the filter's resonance is tuned on and off a signal of interest. This is avoided in the present invention by providing the optical port through the deflectable structure.

The first and second mirror structures preferably comprise dielectric thin film coatings. The support can be fabricated from silicon wafer material. The insulating layer is preferably provided between the support and the deflectable structure. This insulating layer, in one embodiment, functions as an electrostatic cavity spacer. The optical port is typically sized in response to the mode field diameter, so that absorption is minimized.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
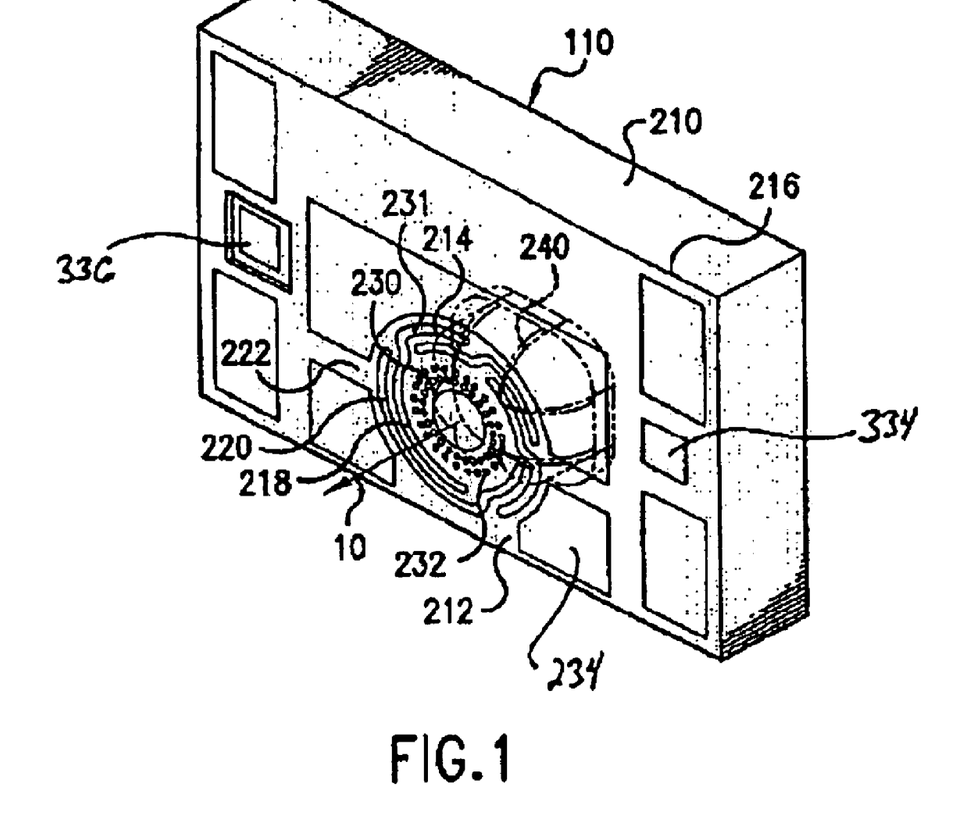
FIG. 1 is a perspective view of the inventive optical membrane device showing the optional backside optical port, in phantom.

FIG. 1 shows an optical membrane device 110 to which the principles of the present invention are applicable in one example.

Generally, the optical membrane device 110 comprises handle material 210 that functions as a support. Currently, the handle material is wafer material such as from a silicon handle wafer, which has been subsequently singulated into the illustrated device.

A device or membrane layer 212 is added to the handle wafer material 210. The release or membrane structure 214 is formed in this device layer 212. Currently, the device layer is between 5 and 10 micrometers in thickness. Preferably, it is between 6 and 8 micrometers in thickness.

An electrically insulating or sacrificial layer 216 separates the membrane layer 212 from the handle wafer material 210 and further defines an electrostatic cavity between the membrane and the electrode of the handle wafer. During manufacture, this insulating layer functions as a sacrificial layer, which is partially removed to release the membrane structure 214 from the handle wafer material 210. In the preferred embodiment, this insulating layer is between 3 and 6 micrometers in thickness.

Currently, the membrane layer 212 is silicon. The membrane layer is manufactured from a silicon wafer that has been bonded to the insulating layer 216 under elevated heat and pressure. Other alternatives are, however, silicon nitride, polycrystalline silicon, or essentially single crystal silicon, which are deposited on the insulating layer.

In the illustrated embodiment, the membrane structure 214 comprises a body portion 218. The optical axis 10 of the device 100 passes concentrically through this body portion 218 and orthogonal to a plane defined by the membrane layer 212. A diameter of this body portion 218 can be preferably 300 to 600 micrometers; currently it is about 500 micrometers.

Tethers 220 extend at least partially in a radial direction from the body portion 218 to an outer portion 222, which comprises the ring where the tethers 220 terminate. In the current embodiment, a spiral tether pattern is used. Other examples include tethers that extend only in the radial direction.

An optical coating dot 230 is typically deposited on the body portion 218 of the membrane structure 214. In a Fabry-Perot filter or other application requiring a reflecting release structure, the optical dot 230 is preferably a highly reflecting (HR) dielectric mirror stack. This yields a low absorption structure that is desirable in, for example, the manufacture of high finesse Fabry-Perot filters. The optical dot can have a concave curvature to form a concave lens. Alternatively, a convex curvature can be provided with an AR coating, for example, to yield a lens.

In the illustrated embodiment, bond pads 234 are deposited on the front side of the membrane device 210. These are used to solder bond, for example, a stationary mirror structure onto the proximal face of the membrane device 10. Bond pads 234 are also useful when installing the membrane device 110 on a micro-optical bench, for example. Also provided are a membrane layer wire bond pad 334 and a handle wafer wire bond pad 336. The membrane layer bond pad is a wire bonding location for electrical control of the membrane layer. The handle wafer bond pad 336 is a wire bond pad for electrical access to the handle wafer material.

A support optical port 240 (shown in phantom) is provided, in some embodiments, extending from a distal side of the handle wafer material 210 to the membrane structure 214.

In the illustrated embodiment, artifacts of the manufacture of the membrane structure 214 are release holes 232. These holes allow an etchant to pass through the body portion 218 of the membrane structure 214 to assist in the removal of the insulating layer 216 during the release process.

Figure 2:
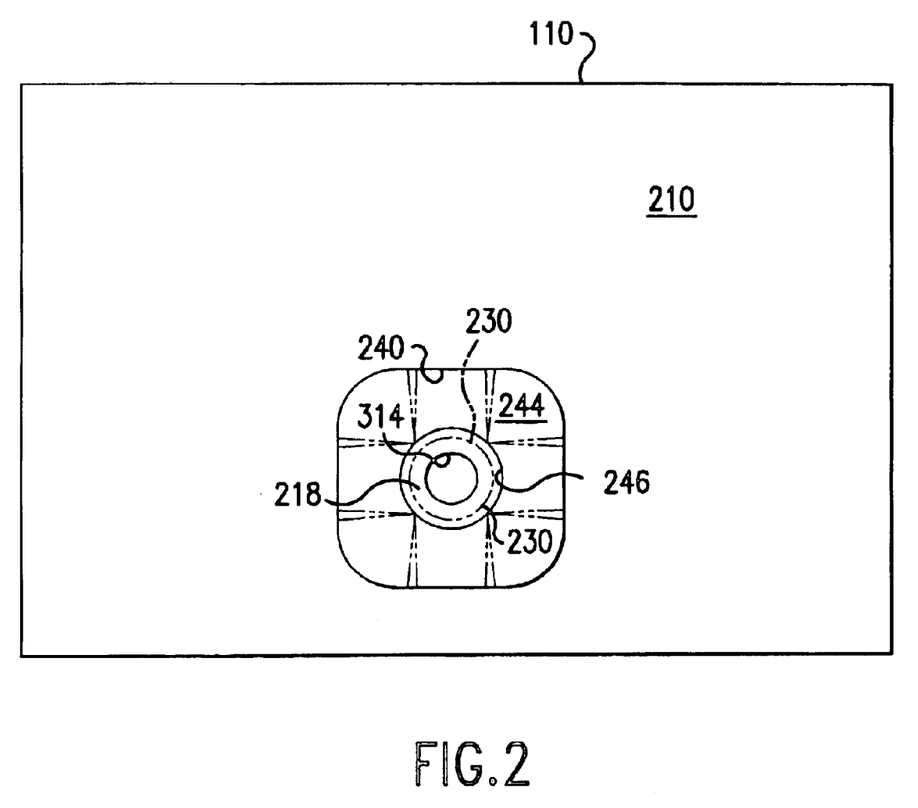
FIG. 2 is an elevation view of the distal side of the inventive optical membrane device showing the optical port.

FIG. 2 further shows the support optical port 240 formed through the distal side of the handle wafer material 210 in the optical membrane device 110. Specifically, the support optical port 240 has generally inward sloping sidewalls 244 that end in the port opening 246. As a result, looking through the distal side of the handle wafer material, the body portion 218 of the membrane structure can be observed and is preferably concentric with the optical coating 230.

According to the invention, a device layer optical port 314 is further provided. As a result, in one embodiment, direct access to the optical dot 230 is provided from the backside. Alternatively, the device layer optical port can be formed only partially through the device layer to thereby reduce the total absorption in the device layer relative to a configuration with no port.

FIGS. 3A–3M illustrate the fabrication steps for the MOEMS optical membrane device illustrated in FIGS. 1 and 2.

Figure 3A:
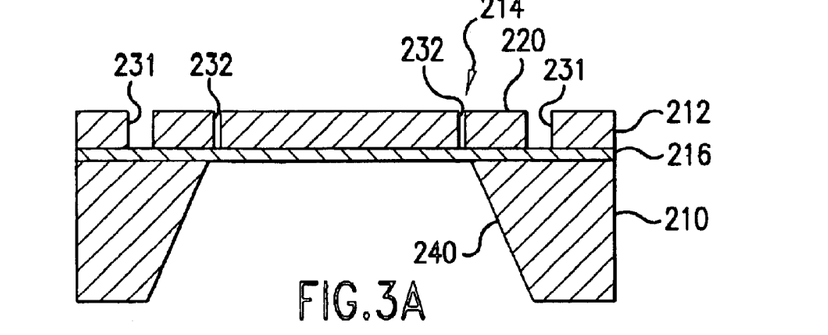
FIGS. 3A through 3M are schematic cross-sectional views illustrating a process for fabricating a membrane device according to the present invention.

Specifically, as illustrated in FIG. 3A, the process, according to the present implementation, the optical port 240 is formed in the backside of the support or handle wafer material 210. A silicon oxide sacrificial layer 216 is formed on the support 210 and a device layer 212 is deposited or installed on the sacrificial layer 216. Further, as also illustrated, the membrane 214 has been patterned into the device layer 212, including the release holes 232 and the trenches 231 defining the tethers 220.

Figure 3B:
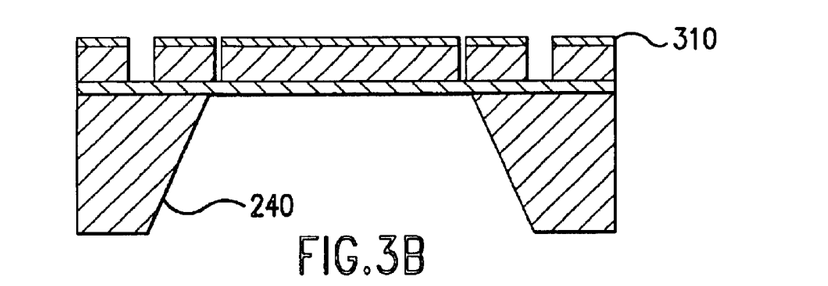

Next, as illustrated in FIG. 3B, a second sacrificial layer 310 is deposited on the device layer 212. The material of this second sacrificial layer is selected based on its ability to be selectively etched relative to an HR coating and the device or membrane layer 212. Presently, a metal such as gold is used.

Figure 3C:
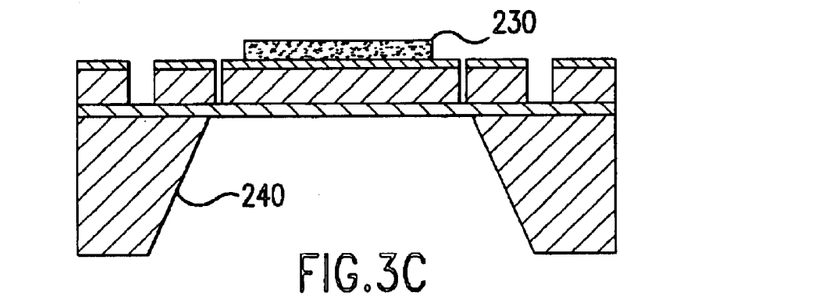

In FIG. 3C, the highly reflective HR coating 230 is deposited on the sacrificial layer 310. In one embodiment, the patterned HR coating 230 is formed by depositing the coating over the entire sacrificial layer 310 and then patterning using as a dry etch process, for example. In an alternative embodiment, the patterned HR coating 230 is deposited on the second sacrificial layer 310 using a shadow mask or lift-off process.

Figure 3D:
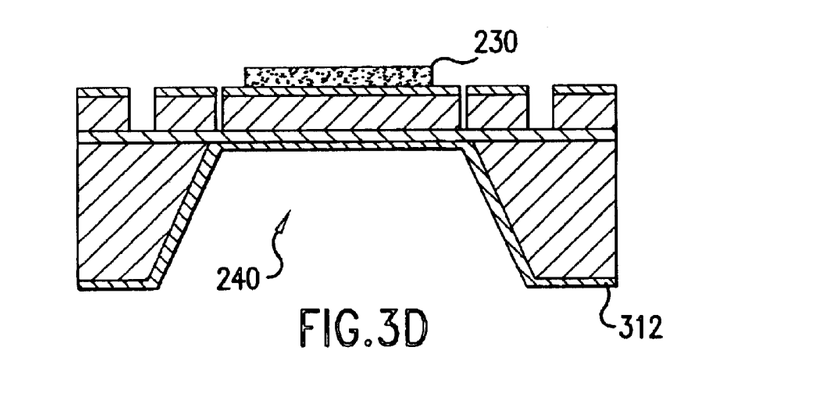

In FIG. 3D, a backside photoresist coating is deposited. Specifically, a photoresist layer 312 is coated over the backside including into the optical port 240.

Figure 3E:
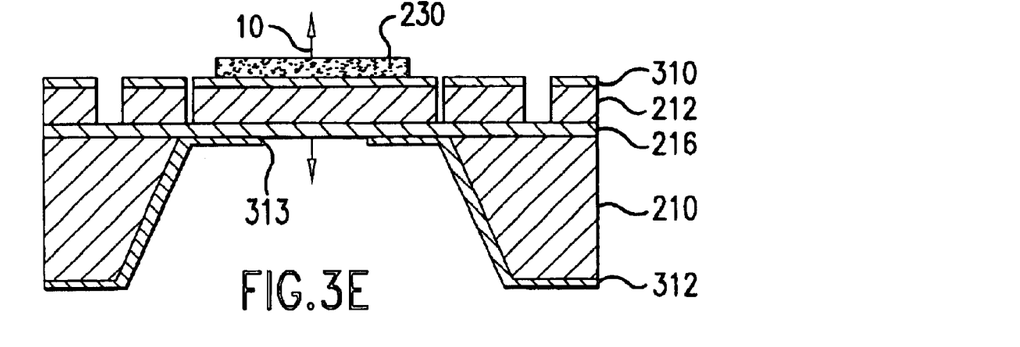

FIG. 3E illustrates the patterning of the backside photoresist 312. Specifically, a pattern 313 for the device layer port is formed along in a region surrounding the optical axis 10.

Figure 3F:
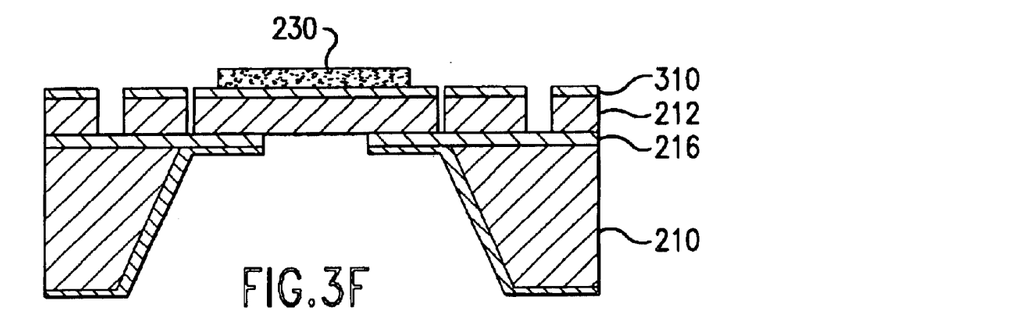

Next, as illustrated in FIG. 3F, the sacrificial oxide layer 216 is removed to access the device layer 212 using an oxide etch process.

Figure 3G:
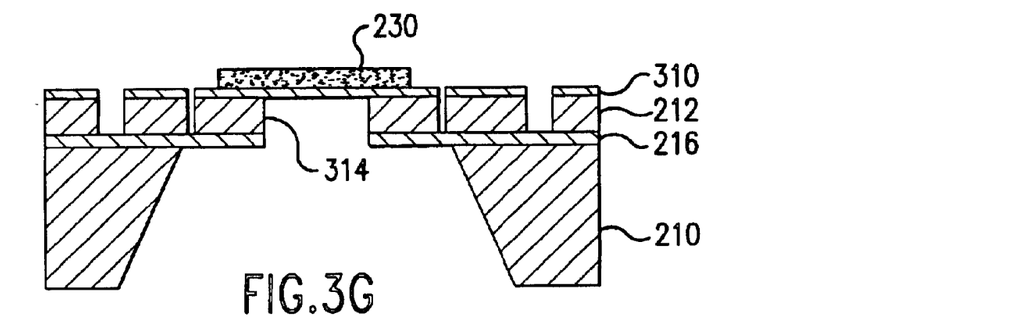

As illustrated in FIG. 3G, the pattern in photoresist layer 312 and sacrificial layer 216 is transferred to the device layer 212 to form the device layer optical port 314. This etch of the device layer is to the depth of the sacrificial layer 310 using a silicon etch process.

Figure 3H:
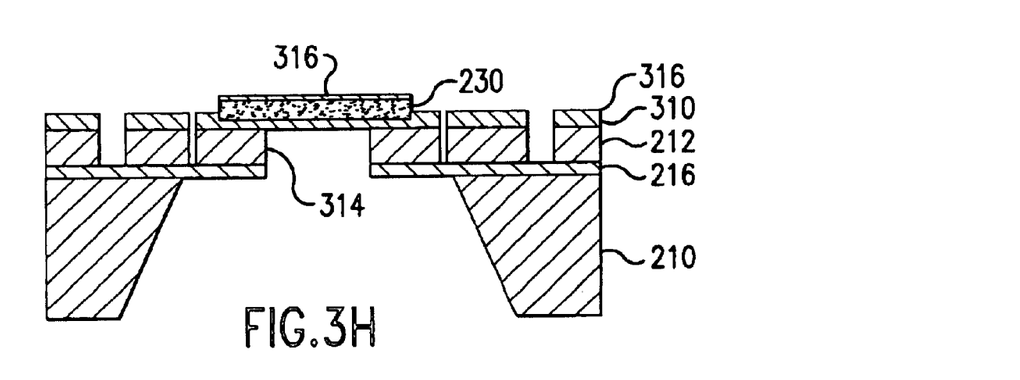
Figure 3I:
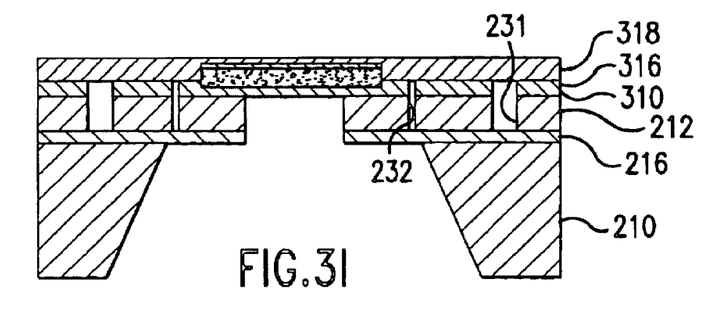
Figure 3J:
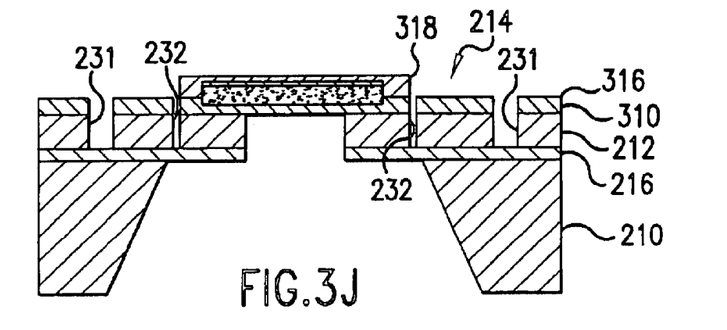

As illustrated in FIG. 3H, the backside photoresist is cleared and a front side protection layer 316 is deposited over the frontside including the HR coating 230 to protect it during subsequent processing steps. A thick photoresist layer 318 is spun-on the front side in FIG. 3I. As illustrated in FIG. 3J, this frontside photoresist layer 318 is patterned back to expose the membrane pattern 214, and specifically the release holes 232 and the trenches 231.

Figure 3K:
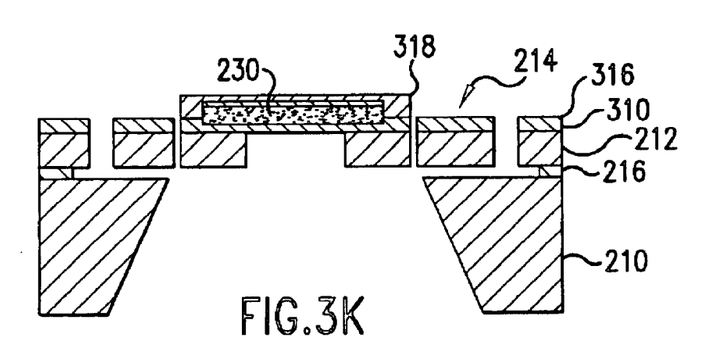
Figure 3L:
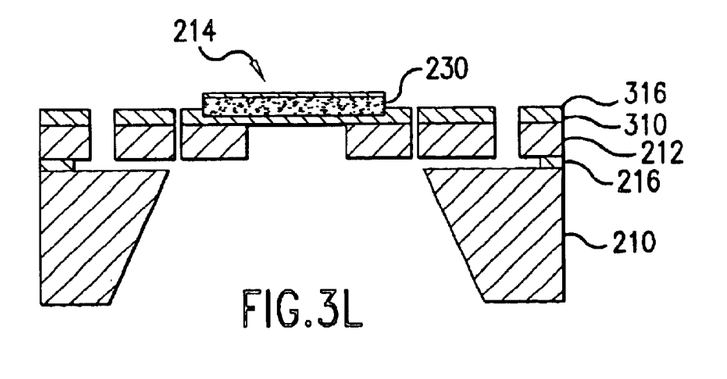
Figure 3M:
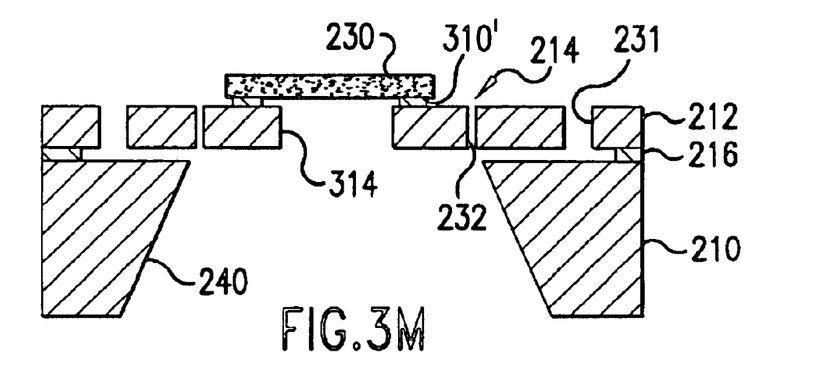

Then, as illustrated by FIG. 3K, a release process is performed in which the oxide sacrificial layer 216 is etched to release the membrane or release structure 214. Note that the HR coating 230 is protected by the front side photoresist layer 318 during this oxide etch. Then, as illustrated in FIG. 3L, the photoresist 318 is then stripped. In FIG. 3M, the protection layer 316 is removed along with the exposed portions of the second, frontside sacrificial layer 310. This leaves small remnants 310' of the second sacrificial layer attaching the HR coating 230 to the membrane release structure 214 of the membrane layer 212.

Figure 4:
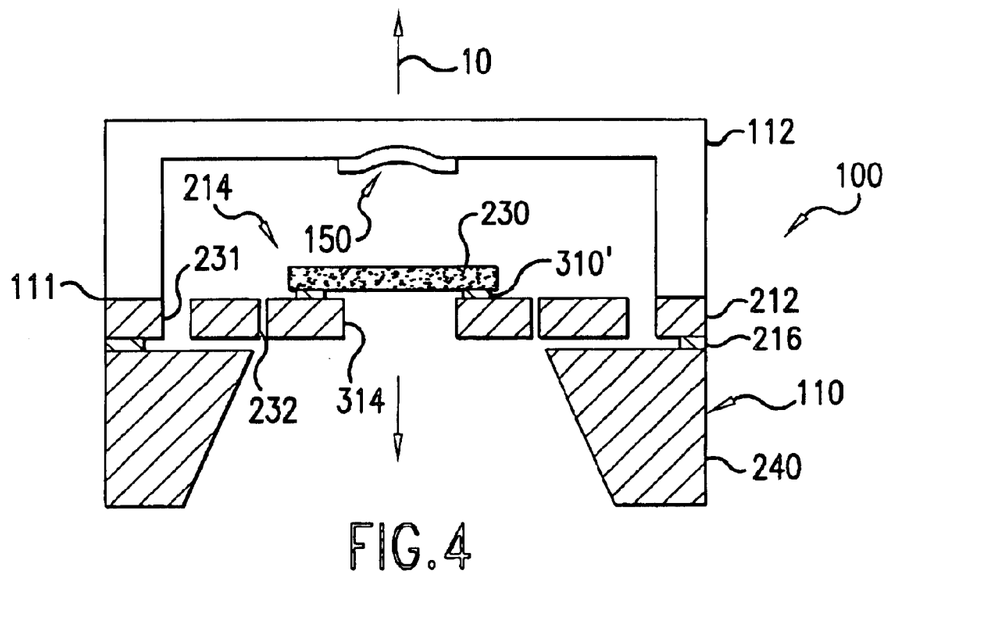
FIG. 4 is a schematic cross-sectional view of the membrane device in tunable Fabry-Perot filter.

FIG. 4 shows a Fabry-Perot tunable filter 100 that is assembled using the membrane device 110 with the suspended HR coating 230. Specifically, a stationary mirror device 112 is attached to the membrane device 110 such as by a solder or thermocompression bond 111. Mirror device 112 comprises a stationary mirror structure 150, which is located opposite mirror structure 230 along the optical axis 10, which passes through the device layer optical port 314 and the suspended HR coating 230.

In the illustrated example, the stationary mirror structure 150 is shown as being curved.

The mode field diameter of the lowest order mode of light resonating in the cavity between the stationary mirror structure 150 and the membrane mirror structure 230 is a function of the spacing between the mirror structures and the mirror curvatures. The port 314 is sized to be preferably greater than the mode field diameter of this lowest order mode to thereby prevent aperturing and related losses.

FIGS. 5A–5I illustrate an alternative process for manufacturing the suspended optical coating.

Figure 5A:
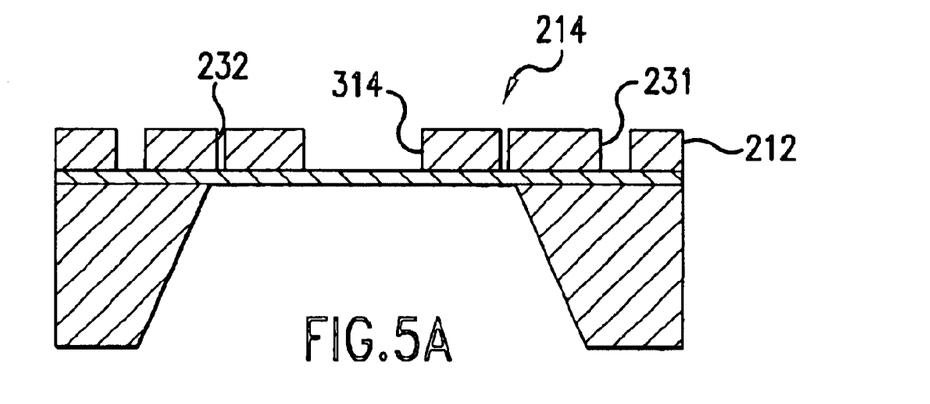
FIGS. 5A through 5I are schematic cross-sectional views illustrating a process for fabricating the membrane device according to a second embodiment of the present invention.
Figure 5B:
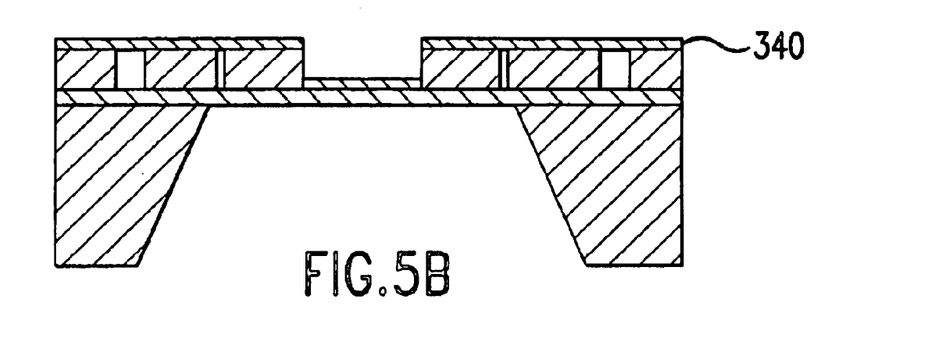
Figure 5C:
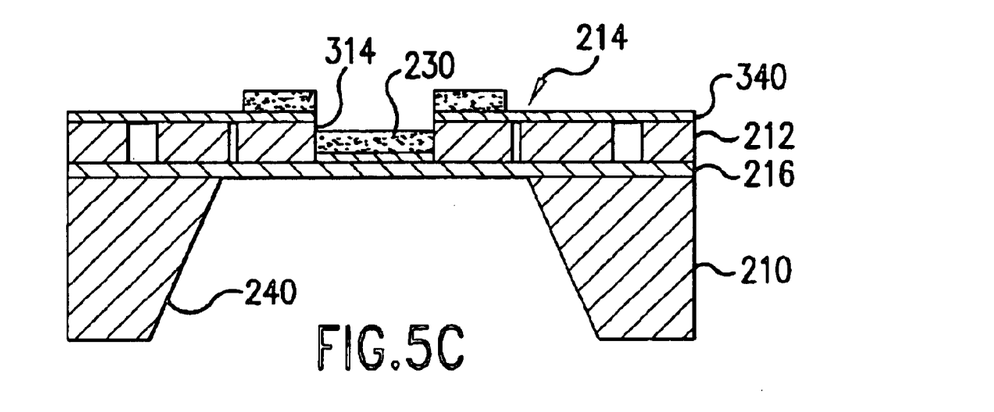

Specifically, as illustrated in FIG. 5A, in addition to patterning the device layer 212 with the membrane pattern 214, which includes the release holes 232 and trenches 231, the device layer optical port 314 is also patterned at this early stage in the process. Then, as illustrated in FIG. 5B, a second sacrificial layer 340 is deposited on the front side. In the present implementation, the sacrificial layer 340 is gold or another metal. An HR coating 230 is then deposited on the front side. This HR coating extends into the region of the device layer optical port 314. This patterned HR can also extend to the periphery of the membrane 214 to reduce alignment tolerances. As described previously, the HR layer 230 can be patterned by a blanket deposition followed by an etch back, or alternatively a lift off or shadow mask process can be used.

Figure 5D:
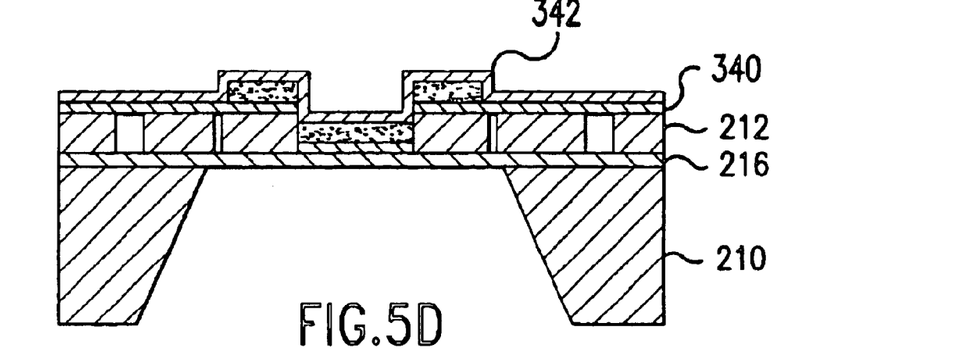
Figure 5E:
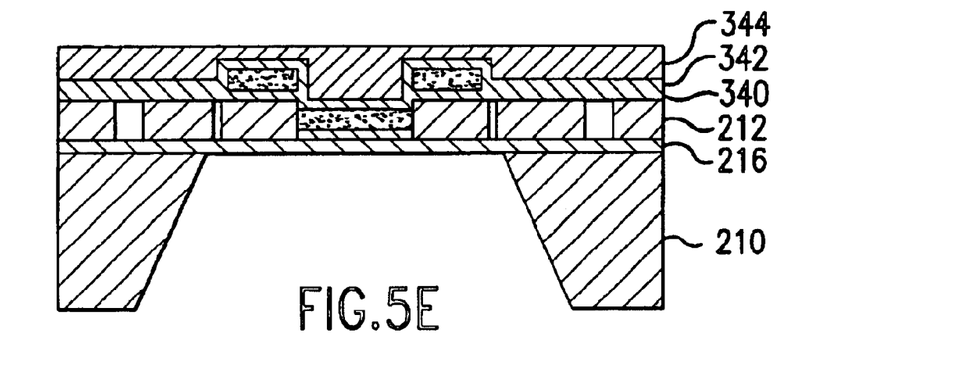
Figure 5F:
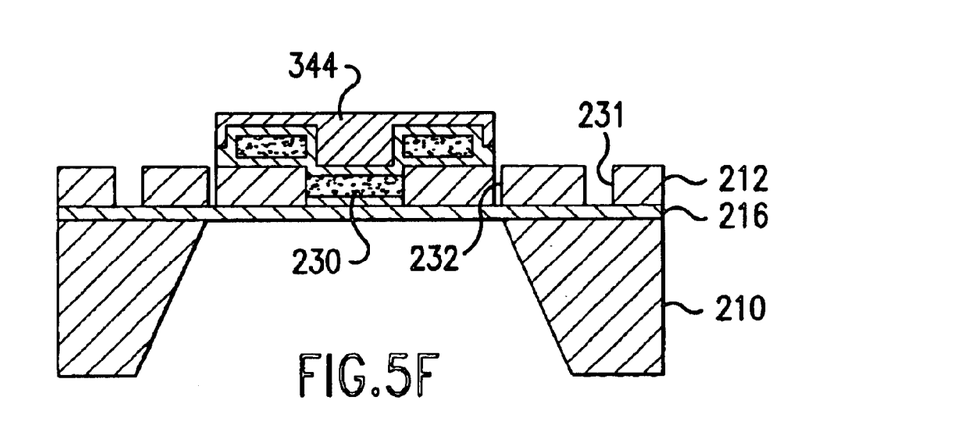
Figures 5G, 5H:
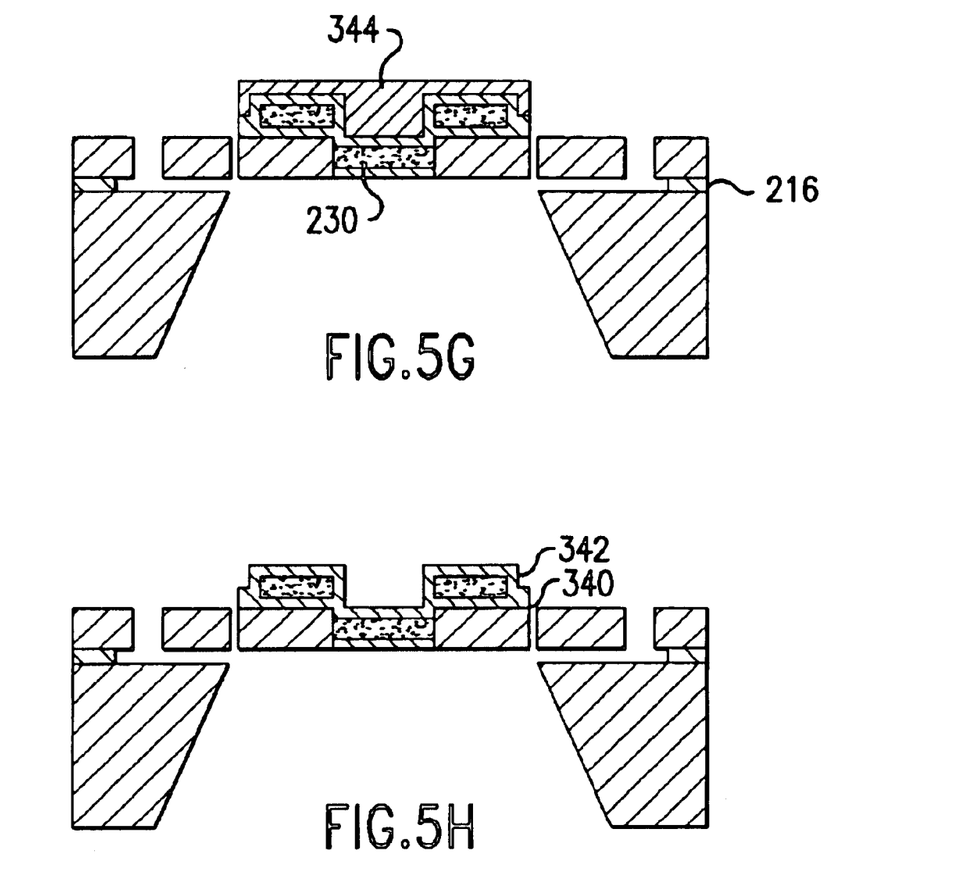
Figure 5I:
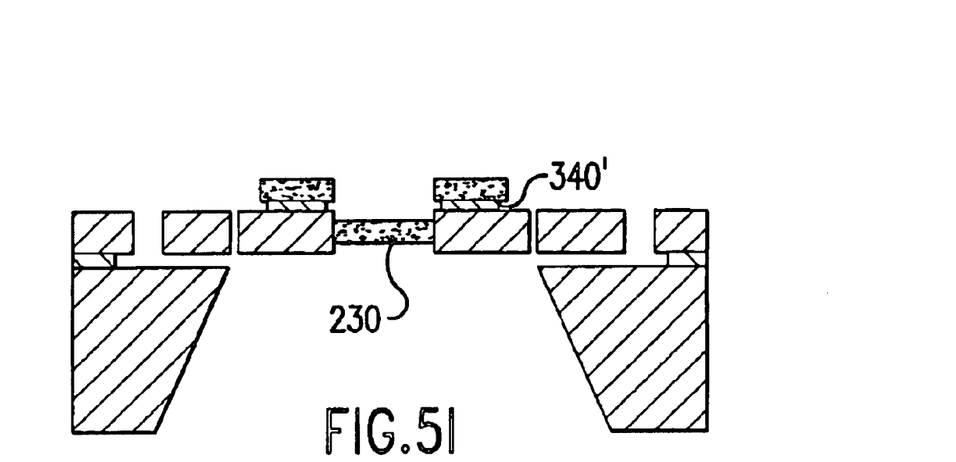
Figure 6:
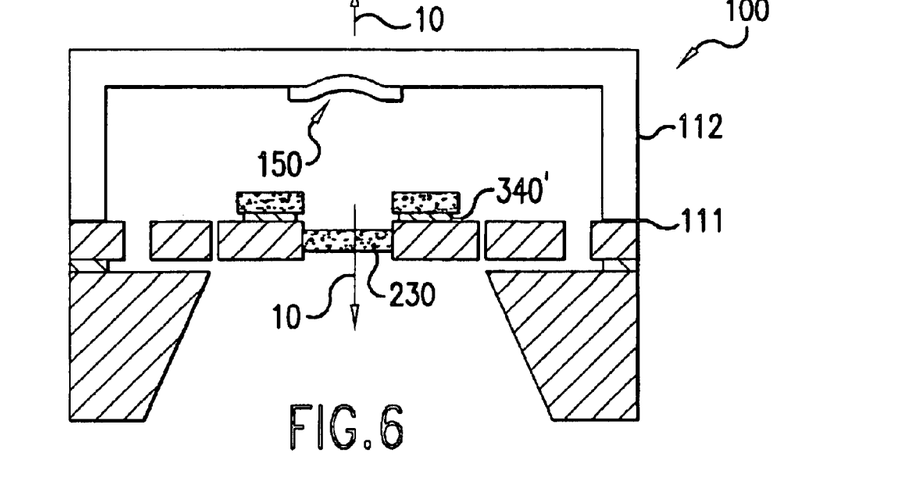
FIG. 6 is a schematic cross-sectional view of the membrane device constructed according to the second embodiment process in tunable Fabry-Perot filter.

Next, as illustrated in FIG. 5D, a protection layer 342 is deposited on the front side. A blanket photoresist 344 is next spin coated on the front side in FIG. 5E. This photoresist layer is patterned to protect the HR coatings 230 but the membrane patterning such as release holes 232 and trenches 231 are exposed as illustrated in FIG. 5F. In FIG. 5G, the release process is performed in which the exposed portions of the sacrificial oxide layer 216 are removed. Note, the HR coating 230 is protected by the photoresist layer 344 during this release process. Then the photoresist is striped as illustrated in FIG. 5H. The protection and sacrificial layers 342, 340 are removed. The only remnants of sacrificial layer 340' remain are under the wings of the HR coating 230, as illustrated in FIG. 5I FIG. 6 shows a Fabry-Perot tunable filter 100 that is assembled using the membrane device 110 with the suspended HR coating 230 fabricated according to the process outlined in FIGS. 5A through 5I. Specifically, stationary mirror device 112 is attached to the membrane device 110 such as by a solder bond 111.

Figure 7A:
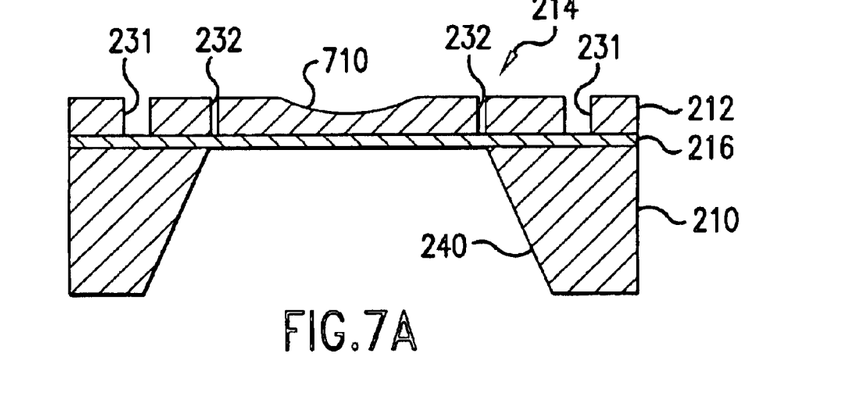
FIGS. 7A and 7B are schematic cross-sectional views illustrating a process for fabricating a membrane device according to a modification of the first embodiment process of the present invention.
Figure 7B:
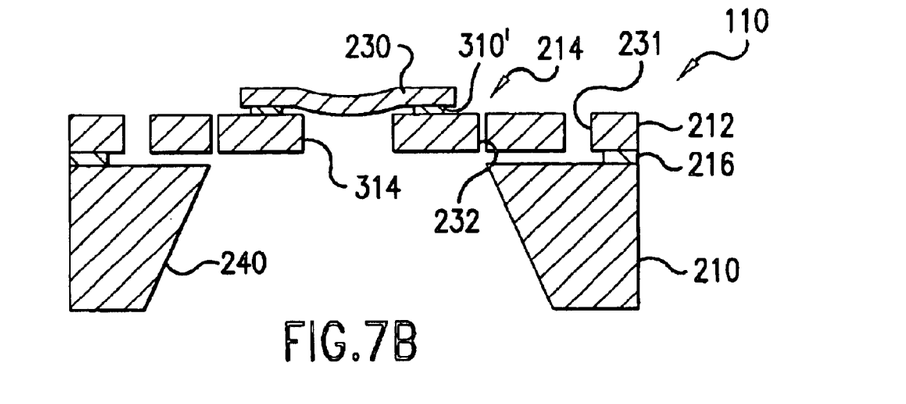

In the previously described implementations, the deflectable mirror structure 230 is flat or near flat. FIGS. 7A and 7B illustrate a process modification to produce a curved suspected HR coating.

As illustrated in FIG. 7A, a concave depression 710 is formed on the membrane layer 212 prior to the deposition of the second sacrificial layer 310 by etching a depression in the sacrificial layer 310 directly, for example. The general approach is illustrated in U.S. patent application Ser. No.

09/804,618, file on Mar. 12, 2001, entitled MEMS Membrane with Integral Mirror/Lens by Flanders, et al., the teachings of which are incorporated herein by this references in their entirety.

FIG. 7B illustrates the final membrane device 110. Specifically, the depression 710 yields a concave mirror structure in the HR coating 230. This device can be paired with a stationary, relatively flat mirror structure or used to define the end of a laser resonator, for example.

While this invention has been particularly shown and described with references to preferred embodiments thereof, it will be understood by those skilled in the art that various changes in form and details may be made therein without departing from the scope of the invention encompassed by the appended claims.

What is claimed is:

1. A process for fabricating a micro-optical electromechanical system device, the process comprising:
   depositing an optical coating that is supported by a device layer;
   removing a sacrificial layer to form a release structure in the device layer along an optical axis; and
   forming a device layer port by removing a portion of the device layer in a region around the optical axis.

2. A process as claimed in claim 1, wherein the step of depositing the optical coating comprises depositing a high reflectivity coating.

3. A process as claimed in claim 1, wherein the step of depositing the optical coating comprises depositing a dielectric thin film coating.

4. A process as claimed in claim 1, wherein the step of depositing the optical coating comprises depositing a dielectric thin film coating having greater than six layers.

5. A process as claimed in claim 1, further comprising installing a mirror structure opposite the optical coating.

6. A process as claimed in claim 1, wherein the step of removing the sacrificial layer comprises etching the sacrificial layer from a region between the device layer and a support.

7. A process as claimed in claim 6, further comprising forming a support optical port through the support along the optical axis.

8. A process as claimed in claim 1, further comprising depositing a sacrificial layer on the device layer and then depositing the optical coating on the etch-stop layer.

9. A process as claimed in claim 8, wherein the step of forming the device layer port comprises etching through the device layer to the etch-stop layer.

10. A process as claimed in claim 9, further comprising removing the etch-stop layer from the region of the device layer port.

11. A process as claimed in claim 1, further comprising forming the device layer port in the device layer and then depositing the optical coating into the device layer port.

12. A MOEMS device, comprising:
    at least first mirror structure and a second mirror structure defining an optical cavity;
    a support; and
    a deflectable structure on the support that holds the first mirror structure, the deflectable structure being located on an external side of the first mirror structure relative to the optical cavity, the deflectable structure having an optical port in a region around an optical axis of the optical cavity.

13. A device as claimed in claim 12, wherein the first mirror structure and the second mirror structure each comprise a dielectric thin film coating.

14. A device as claimed in claim 12, wherein the first mirror structure is suspended on the deflectable structure across the optical port in the deflectable structure.

15. A device as claimed in claim 12, wherein the support comprises silicon wafer material.

16. A device as claimed in claim 12, further comprising an insulating layer between the support and the deflectable structure.

17. A device as claimed in claim 16, wherein insulating layer functions as an electrostatic drive cavity spacer.

18. A device as claimed in claim 12, wherein the optical port is sized in response to a mode field diameter of light resonating in the optical cavity.

19. A MOEMS device, comprising:
    at least first mirror structure and a second mirror structure defining an optical cavity;
    a support; and
    a deflectable structure on the support that holds the first mirror structure, the deflectable structure being released from the support by partial removal of a sacrificial layer, the deflectable structure having an optical port in a region around an optical axis of the optical cavity that is formed by removal of a layer in which the deflectable structure is formed in a region around the optical axis.

20. A device as claimed in claim 19, wherein the first mirror structure and the second mirror structure each comprise a dielectric thin film coating.

21. A device as claimed in claim 19, wherein the first mirror structure is suspended on the deflectable structure across the optical port in the deflectable structure.

22. A device as claimed in claim 19, wherein the support comprises silicon wafer material.

23. A device as claimed in claim 19, further comprising an insulating layer between the support and the deflectable structure.

24. A device as claimed in claim 23, wherein insulating layer functions as an electrostatic drive cavity spacer.

25. A device as claimed in claim 19, wherein the optical port is sized in response to a mode field diameter of light resonating in the optical cavity.

* * * * *